United States Patent [19]
Harpin et al.

[11] Patent Number: 6,108,478
[45] Date of Patent: Aug. 22, 2000

[54] TAPERED RIB WAVEGUIDE

[75] Inventors: Arnold Peter Roscoe Harpin, Oxford; Andrew George Rickman, Marlborough; Robin Jeremy Richard Morris, Oxford; Mehdi Asghari, Swindon, all of United Kingdom

[73] Assignee: Bookham Technology Limited, United Kingdom

[21] Appl. No.: 09/019,732

[22] Filed: Feb. 6, 1998

[30] Foreign Application Priority Data

Feb. 7, 1997 [GB] United Kingdom .................... 9702579

[51] Int. Cl.$^7$ ........................................ G02B 6/10
[52] U.S. Cl. ............................. 385/129; 385/132
[58] Field of Search ..................... 385/129, 132, 385/130

[56] References Cited

U.S. PATENT DOCUMENTS

| | | | |
|---|---|---|---|
| 5,078,516 | 1/1992 | Kapon et al. ........................ | 385/129 |
| 5,278,926 | 1/1994 | Doussiere ............................ | 385/28 |
| 5,444,805 | 8/1995 | Mayer ................................ | 385/49 |

FOREIGN PATENT DOCUMENTS

| | | | |
|---|---|---|---|
| 0687925 | 12/1995 | European Pat. Off. ......... | G02B 6/12 |
| 9742534 | 11/1997 | WIPO ............................ | G02B 6/30 |

OTHER PUBLICATIONS

Margail, J. et al., entitled "Reduced Defect in Silicon–on–Insulator Structures Formed by Oxygen Implantation in Two Steps", Appl. Phys. Lett. 54, pp. 526–528, Feb. 6, 1989.

Tang C.K. et al., entitled "Development of a Library of Low–Loss Silicon–On–Insulator Optoelectronic Devices" IEE Proceedings Optoelectronics, vol. 143, No. 5, Oct. 1996, pp. 312–315.

Schmidtchen, J., et al., "Low Loss Singlemode Optical Waveguides with Large Cross–Section in Silicon–On–Insulator", Electronics Letters, vol. 27, No. 16, Aug. 1991, pp. 1486–1488.

*Primary Examiner*—Rodney Bovernick
*Assistant Examiner*—Robert E. Wise
*Attorney, Agent, or Firm*—Webb Ziesenheim Logsdon Orkin & Hanson, P.C.

[57] ABSTRACT

A tapered rib waveguide tapering from a large, multi-mode optical waveguide to a smaller, single-mode optical waveguide, the tapered rib waveguide comprising two portions (4,5) formed of the same material: a lower portion (4) which tapers laterally from the large waveguide to the smaller waveguide and an upper portion (5) formed on the lower portion (4), which tapers to a point (or other form of termination), the dimensions of the two portions (4,5) being such that substantially all of a fundamental mode propagated in the large multi-mode waveguide is coupled to the smaller, single-mode waveguide.

19 Claims, 3 Drawing Sheets

TAPERED RIB WAVEGUIDE

TECHNICAL FIELD

This invention relates to a tapered rib waveguide providing a transition from an optical waveguide of relatively large cross-section to an optical waveguide of smaller cross-section.

BACKGROUND ART

An integrated optical circuit employs optical waveguides to transmit light around the circuit and to connect to external optical waveguides such as optical fibres. The integrated optical waveguides and/or optical fibres may be of different cross-sectional size so there is a need for means to provide a transition from a waveguide of relatively large cross-section to a waveguide of smaller cross-section. A variety of devices have been proposed for this purpose but they tend to be relatively complex and/or difficult to fabricate.

This invention aims to provide a tapered rib waveguide which is of relatively simple construction, is relatively easy to fabricate and which provides a low-loss transition from a large cross-section to a smaller cross-section.

It should be noted that terms such as "upper", "lower", "laterally" etc. used herein are used in a relative sense, i.e. relative to the orientation of the apparatus shown in the accompanying drawing, and are not intended to imply any orientation with respect to the force of gravity.

DISCLOSURE OF INVENTION

According to a first aspect of the present invention, there is provided a tapered rib waveguide tapering from a large, multi-mode optical waveguide to a smaller, single-mode optical waveguide, the tapered rib waveguide comprising at least two portions formed of the same material: a lower portion which tapers laterally from the large waveguide to the smaller waveguide and an upper portion, formed on the lower portion, which tapers to a point or other form of termination, the dimensions of the two portions being arranged such that substantially all of a fundamental mode propagated in the large multi-mode waveguide is coupled to the smaller, single-mode waveguide.

Preferred features of the invention will be apparent from the subsidiary claims of the specification and from the following description.

BRIEF DESCRIPTION OF DRAWINGS

The invention will now be further described, merely by way of example, with reference to the accompanying drawings in which.

BEST MODE OF CARRYING OUT THE INVENTION

Figure 1:
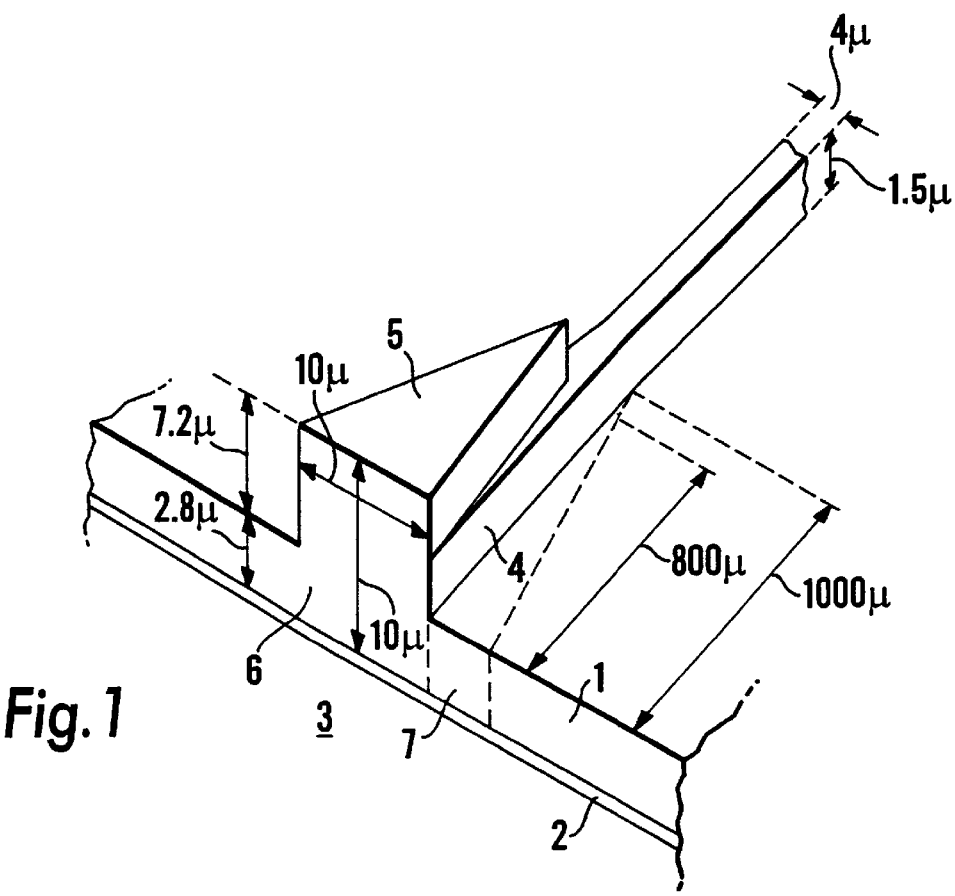
FIG. 1 shows a perspective view of a preferred embodiment of a tapered rib waveguide according to the invention.

The drawing shows a tapered rib waveguide tapering from a large multi-mode waveguide about 10 microns×10 microns to a smaller single-mode waveguide about 4.3 microns×4 microns.

The illustrated waveguides are in the form of ribs formed on the upper surface of a silicon layer, e.g. of a silicon-on-insulator chip. The silicon-on-insulator chip is preferably manufactured from conventional wafers such as those used in Very Large Scale Integration (VSLI) electronic circuits. The paper "Reduced defect density in silicon-on-insulator structures formed by oxygen implantation in two steps" by J. Morgail et al, Appl. Phys. Lett, 54, p 526, 1989 describes the manufacture of suitable wafers. Methods of manufacturing rib waveguides on a silicon-on-insulator chip are described in the paper "Low loss single mode optical waveguides with large cross-section in silicon-on-insulator" by J. Schmidtchen et al, Electronic Letters, 27, p 1486, 1991.

The drawing shows the rib waveguides formed in the silicon layer 1 of such a chip and shows the oxide layer 2 separating the silicon layer 1 from a silicon substrate 3. A silicon dioxide cladding (not shown) is also usually provided over the rib.

The tapered rib waveguide shown in the drawing comprises two portions: a lower portion 4 which tapers laterally from a width of about 10 microns to a width of about 4 microns over a length of about 1000 microns, and an upper portion 5, formed on the lower portion 4, which tapers from a width of about 10 microns to a point over a length of about 800 microns. The upper portion 5 thus tapers more rapidly than the lower portion 4 and in the embodiment shown has a triangular, wedge-like shape when viewed from above. Both portions are, however, designed to provide a substantially adiabatic taper.

In another arrangement (not shown), both the upper and lower portions 5 and 4 taper at the same angle so the sides of the two portions are parallel to each other. In this case, the wide end of the upper portion 5 is narrower than the wide end of the lower portion 4.

The upper and lower portions 5 and 4 preferably taper at an angle (with respect to the axis of the waveguide) of less than 1 degree and preferably less than 0.5 of a degree. Such a gradual taper ensures that any losses caused by the taper are kept small. The upper portion 4 tapers to a point or to some other form of termination. In the arrangement shown in FIG. 1, the tapering section of the upper portion 5 is formed on top of the tapering section of the lower portion 4.

The two portions 4 and 5, including the input facet 6, can be formed together by conventional lithography and dry etching as they are defined by vertical surfaces. They are formed of the same material and thus have the same refractive index. The two portions may be formed homogenously on the chip. Alternatively, the upper portion 5 may be formed separately and mounted on the lower portion 4.

The upper faces of the upper and lower portions 4 and 5 are substantially parallel to the plane of the chip, i.e. the upper and lower portions 4 and 5 each have a substantially constant height above the surface of the chip (7.2 and 1.5 microns, respectively, in the illustrated example).

The tapered rib waveguide shown in the drawing thus provides a two-dimensional taper, the taper in the lateral direction being provided by an actual tapering of the waveguide and the taper in the vertical direction (i.e. perpendicular to the plane of the chip) being provided by means of the laterally tapered upper portion 5. The problems associated with forming a vertically tapered waveguide, i.e. defined by non-vertical surfaces, as used in some of the prior art, are thus avoided.

The shape and dimensions of the tapered rib waveguide are such that if the large, multi-mode waveguide is excited in a fundamental mode only, this mode is forced down into the smaller, single-mode waveguide as the cross-sectional shape of the waveguide changes gradually from that of the larger waveguide to that of the smaller waveguide. The effective refractive index in the upper portion 5 is progressively reduced as it tapers. This forces the mode into the lower portion 4 of the waveguide. It should be noted that the tapered rib waveguide does not require a refractive index difference between the two portions or for the maintenance of single-mode operation of the larger waveguide. As indicated above, the larger 10 micron×10 micron waveguide is a multi-mode waveguide but if it is excited by a fundamental mode on its axis, e.g. from an optical fibre, the power in higher order modes is negligible.

The large refractive index difference between the silicon waveguide and the silicon dioxide cladding (not shown) helps ensure that the effective refractive index of the upper portion 5 is suppressed sufficiently for the optical mode to be substantially entirely guided into the lower portion 4 before the narrowest section thereof is reached. Thus, as indicated above, the upper portion 5 need not taper to a point so the difficulties of fabricating very narrow sections at the narrow end of the upper portion 5 can be avoided.

The dimensions of the two portions 4 and 5 are selected in accordance with conventional requirements of rib waveguides and with appropriate dimensions substantially all of a fundamental mode propagated in the large multi-mode waveguide is coupled to the smaller, single-mode waveguide.

A typical example having dimensions as shown in the drawing provides a low-loss coupling (typically 0.1 dB or less) between the two waveguides.

The tapered rib waveguide described herein may be used to provide a transition between a variety of sizes of waveguide and particularly from an optical fibre to a smaller integrated waveguide. The larger waveguide typically has cross-sectional dimensions in the range 7–12 microns wide by 7–12 microns deep (and is thus compatible with conventional optical fibres) and the smaller waveguide typically has cross-sectional dimensions in the range 2–5 microns wide by 4–5 microns deep (and is thus compatible with conventional integrated optical waveguides). As shown in FIG. 1, the depth is measured from the oxide layer 2.

As indicated above, the input facet 6 may be formed by dry etching, no saw cuts or polishing being necessary. The facet 6 may be perpendicular to the axis of the waveguide or may be angled.

It will also be appreciated that the tapered rib waveguide can be used in either direction, i.e. from a large waveguide to a small waveguide or from a small waveguide to a large waveguide.

The tapered rib waveguide described above is easily integrated with other components of an integrated optical circuit. An optical fibre (not shown) inputting light into facet 6 may be positioned in a V-groove (not shown) provided in the silicon-on-insulator chip. The position of the V-groove and of the tapered rib waveguide may be defined by a common lithographic step so they are automatically aligned with each other.

The applicants' co-pending application no. PCT/GB96/01068 (Publication no. WO97/45234) describes a connection between an integrated optical waveguide and an optical fibre and is hereby incorporated herein. This earlier application describes a rib waveguide formed on a silicon-on-insulator chip, the rib waveguide and underlying layer of silicon dioxide overhanging the end of a V-groove formed in the chip in which an optical fibre is positioned so the end of the rib waveguide lies in close proximity with the end of the optical fibre, the overhang being required as the end of the V-groove is not formed perpendicular to the surface of the chip.

The tapered rib waveguide structure described herein may be formed on such an overhang to provide a transition between a large, multi-mode waveguide for receiving light from the optical fibre and a smaller, single-mode integrated waveguide formed on the chip.

The illustrated embodiment comprises a tapered rib waveguide formed as a straight waveguide. In some circumstances, however, it may be desirable to form a similar structure on a gradually curving waveguide. The tapered sides of the upper and lower portions 4 and 5 do not need to be straight but may also be curved, nor need they necessarily be symmetrical.

As indicated above, the taper should be gradual. If the taper is too rapid, the losses will be higher. On the other hand, if the taper is too gradual, the device may be larger than is desirable. A compromise between these two requirements is usually necessary.

In addition to tapering the lower portion 4, a tapered section of the silicon slab 7 may also be removed as shown by dashed lines in FIG. 1. Removal of the slab 7 adjacent the rib waveguide increases the refractive index difference between the waveguide and its surroundings and by gradually narrowing the gap 7, the effective refractive index difference is gradually reduced.

The illustrated embodiment shows a tapered waveguide having two layers, i.e. the upper portion 5 and lower portion 4. However, it will be appreciated that further layers may be provided, e.g. an additional tapering portion on top of the upper portion 5, and that the tapering may occur in two or more stages at different positions along the waveguide.

Figure 2A:
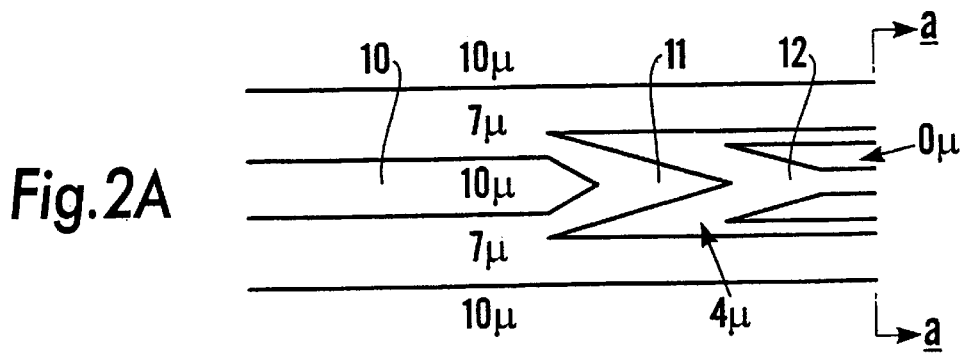
FIG. 2A is a schematic plan view of another embodiment of a tapered rib waveguide according to the invention, and FIG. 2B a cross-section thereof.
Figure 2B:
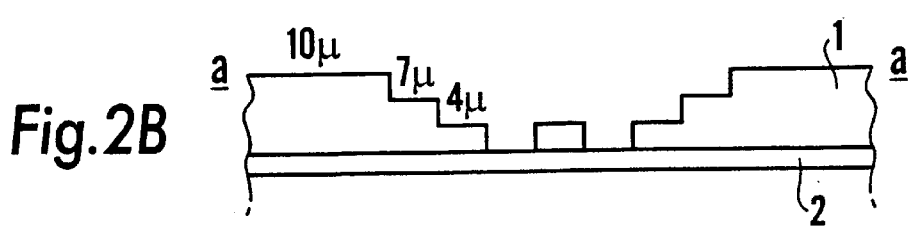

FIGS. 2A and 2B are schematic diagrams illustrating an example of a multi-stage tapered rib waveguide. A 10 microns high rib 10 initially tapers to a 7 microns high rib 11 which then tapers to a 4 microns high rib 12. FIG. 2B shows a cross-section taken across line a—a of FIG. 2A. By this means a 10×10 microns waveguide can be tapered down in two stages to a 2×4 microns waveguide, e.g. for coupling with a laser. The tapered portion 10 overlaps the tapered portion 11 so as to reduce or minimize losses due to light diverging as it is forced down from portion 10 to portion 11 and, similarly, tapered portion 11 overlaps tapered portion 12.

Figure 3A:
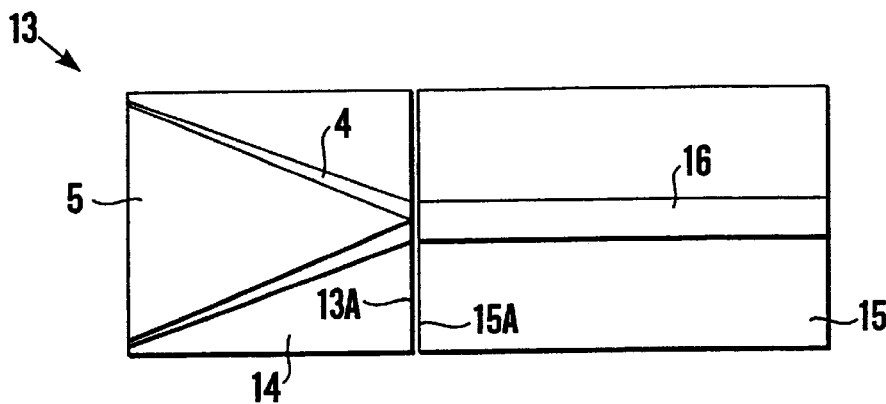
FIGS. 3A and 3B, 4A and 4B, and 5A and 5B show schematic plan and side views of three further embodiments of a tapered rib waveguide according to the invention.
Figure 3B:
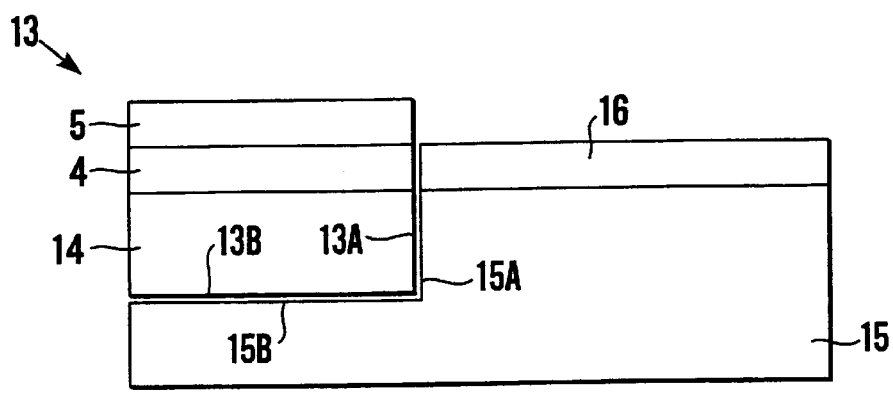

FIGS. 3–5 show further embodiments of a tapered waveguide,

The arrangement shown in FIGS. 3A and 3B is similar to that shown in FIG. 1 except that the tapered structure 13, comprising the upper and lower portions 5 and 4 and a substrate 14 on which these are formed, is a separate component which is mounted on a silicon-on-insulator chip 15 and aligned with a waveguide 16 thereon. This enables the tapered structure 13 to be formed of a different material, e.g. silicon dioxide or silicon nitride, and enables it to be fabricated separately from the remainder of the optical circuit.

The tapered structure 13 is mounted on the silicon-on-insulator chip 15 by locating surfaces 13A and 13B against corresponding surfaces 15A and 15B in a recess or cut-out section of the chip 15. A further pair of abutting surfaces (not shown) may be provided for locating it in a lateral direction relative to the waveguide 16. The tapered structure 13 may be secured in place by means of adhesive.

Figure 4A:
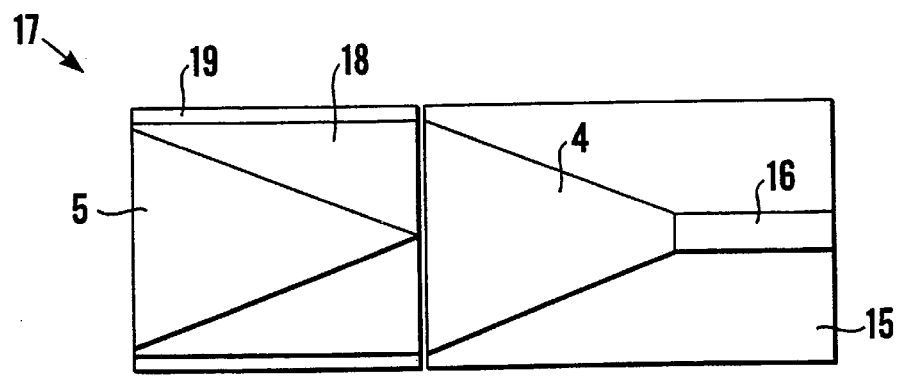
Figure 4B:
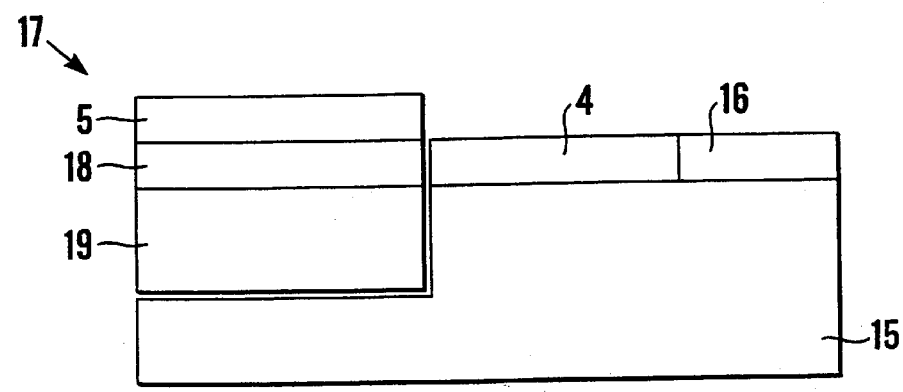

A two-stage tapered waveguide may also be made in a similar manner as shown in FIGS. 4A and 4B. In this case, a separate tapered structure 17 is provided which comprises the upper tapered portion 5 on an untapered portion 18 and a substrate 19. The lower tapered portion 4 is formed on the silicon-on-insulator chip 15. The tapered structure 17 is mounted on and aligned with the silicon-on-insulator chip 15 in a similar manner to that described above.

Figure 5A:
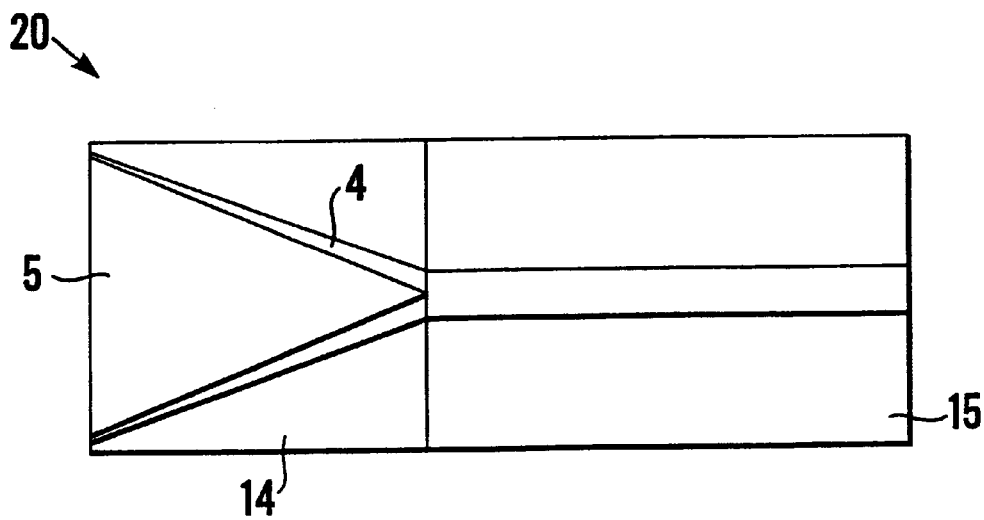
Figure 5B:
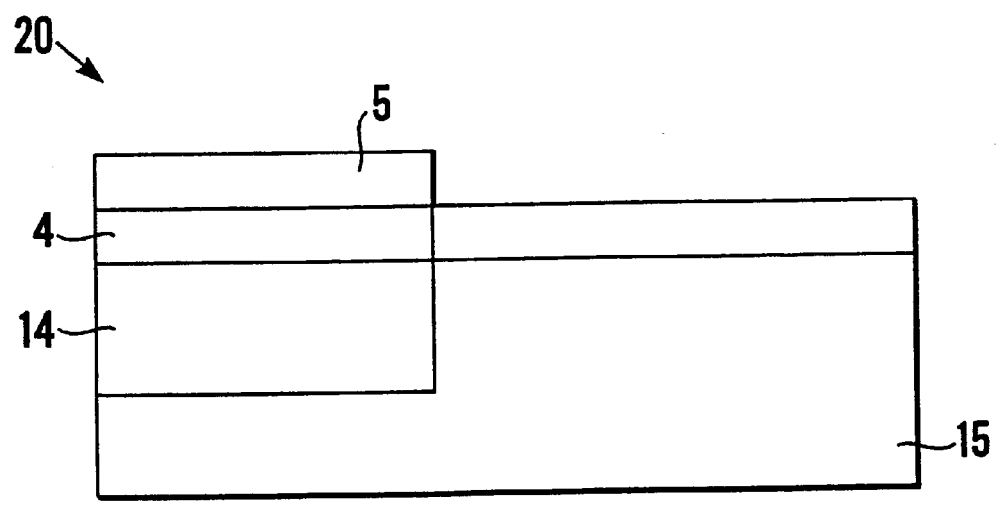

FIGS. 5A and 5B show a further arrangement in which a tapered structure 20 of a different material is fabricated directly onto a silicon-on-insulator chip 15. FIGS. 5A and 5B are similar to FIGS. 3A and 3B but in this case the upper and lower portions 5 and 4 and substrate 14 are fabricated directly onto the chip 15. The tapered structure 20 may, for example, be formed of silicon dioxide deposited or grown on the silicon-on-insulator chip 15 or formed of a polymer material spun onto the chip.

As the tapered structures 13, 17 and 20 are formed of a different material compared to the waveguide 16 (and lower portion 4 in FIG. 4), an anti-reflective coating is preferably provided between the two to help reduce back-reflection of light passing from the tapered structure into the silicon-on-insulator device.

Although the examples described above are formed on a silicon-on-insulator chip, and although this has the advantages referred to above, a similar tapered rib waveguide can be formed on other types of chip.

We claim:

1. A tapered rib waveguide tapering from a large, multi-mode optical waveguide to a smaller, single-mode optical waveguide, the tapered rib waveguide comprising at least two portions formed of the same material;

a lower portion which tapers inwards laterally from the large waveguide to the smaller waveguide and an upper portion, formed on the lower portion, which tapers inwards to a point or other form of termination in the direction from the large waveguide to the smaller waveguide, the dimensions of the two portions being arranged such that substantially all of a fundamental mode propagated in the large multi-mode waveguide is coupled to the smaller, single-mode waveguide.

2. A tapered rib waveguide as claimed in claim 1 in which the shapes of the upper and lower portion are defined by vertical surfaces.

3. A tapered rib waveguide as claimed in claim 1 in which a tapering section of the upper portion overlaps or is formed on top of a tapering section of the lower portion.

4. A tapered rib waveguide as claimed in claim 1 in which the upper and lower portions are each of substantially constant height.

5. A tapered rib waveguide as claimed in claim 1 in which the upper and lower portions taper laterally with respect to an axis of the waveguide at an angle of less than 1 degree.

6. A tapered rib waveguide as claimed in claim 1 in which the large waveguide has cross-sectional dimensions in the range 7–12 microns wide by 7–12 microns deep.

7. A tapered rib waveguide as claimed in claim 1 in which the smaller waveguide has cross-sectional dimensions in the range 2–5 microns wide by 4–5 microns deep.

8. A tapered rib waveguide as claimed in claim 1 in which the first and second portions are formed homogenously.

9. A tapered rib waveguide as claimed in claim 1 having a further tapered portion intermediate the upper portion and the lower portion whereby tapering occurs in stages from the large waveguide, to an intermediate size waveguide and then to the small waveguide.

10. A tapered rib waveguide as claimed in claim 1 in which a tapered portion of a slab waveguide adjacent the lower portion of the rib waveguide is also removed.

11. A tapered rib waveguide as claimed in claim 1 formed on a silicon-on-insulator chip.

12. A tapered rib waveguide as claimed in claim 11 aligned with a V-groove for receiving an optical fibre.

13. A tapered rib waveguide as claimed in claim 12 formed on a part of the silicon chip which overhangs an end of the V-groove formed in the chip.

14. A tapered rib waveguide as claimed in claim 1 in which the upper portion is formed as part of a separate structure which is mounted in alignment with the smaller, single-mode waveguide.

15. A tapered rib waveguide as claimed in claim 14 in which the lower portion and the upper portion are formed as part of a separate structure which is mounted in alignment with the smaller, single-mode waveguide.

16. A tapered rib waveguide as claimed in claim 1 in which the upper and/or the lower portion are formed of a different material than the smaller, single-mode waveguide.

17. A tapered rib waveguide as claimed in claim 16 in which the upper and lower portions are formed of a material which is grown, deposited or spun onto a substrate on which the smaller, single-mode waveguide is formed.

18. A tapered rib waveguide as claimed in claim 1 providing a coupling between an optical fibre and an integrated optical waveguide.

19. A tapered rib waveguide as claimed in claim 1 in which the upper and lower portions taper laterally with respect to an axis of the waveguide at an angle of less than 0.5 degree.

* * * * *